(12) United States Patent
Hovland et al.

(10) Patent No.: US 10,151,193 B2
(45) Date of Patent: Dec. 11, 2018

(54) INSPECTION ASSEMBLY

(71) Applicant: Vision IO AS, Stavanger (NO)

(72) Inventors: Øyvind Hovland, Røyneberg (NO); André Hognestad, Randaberg (NO)

(73) Assignee: Vision IO AS, Stavanger (NO)

( * ) Notice: Subject to any disclaimer, the term of this patent is extended or adjusted under 35 U.S.C. 154(b) by 203 days.

(21) Appl. No.: 15/101,796

(22) PCT Filed: Dec. 1, 2014

(86) PCT No.: PCT/EP2014/076042
§ 371 (c)(1),
(2) Date: Jun. 3, 2016

(87) PCT Pub. No.: WO2015/082371
PCT Pub. Date: Jun. 11, 2015

(65) Prior Publication Data
US 2016/0305233 A1    Oct. 20, 2016

(30) Foreign Application Priority Data
Dec. 5, 2013    (NO) .................................... 20131619

(51) Int. Cl.
*E21B 33/12*    (2006.01)
*E21B 47/00*    (2012.01)
(Continued)

(52) U.S. Cl.
CPC .......... *E21B 47/0002* (2013.01); *E21B 33/12* (2013.01); *E21B 47/011* (2013.01); *G03B 37/005* (2013.01)

(58) Field of Classification Search
CPC ........ E21B 47/0002; H05N 5/00; H05K 7/00; G01N 21/00
See application file for complete search history.

(56) References Cited

U.S. PATENT DOCUMENTS 2,912,495 A    11/1959    Moon et al.
3,596,582 A    8/1971    Sayer
(Continued)

FOREIGN PATENT DOCUMENTS

WO    2011037591 A1    3/2011

OTHER PUBLICATIONS

International Search Report and Written Opinion dated Aug. 19, 2015, for corresponding International Application No. PCT/EP2014/076042; International Filing Date: Dec. 1, 2014 consisting of 9 pages.

(Continued)

*Primary Examiner* — D. Andrews
*Assistant Examiner* — Dany E Akakpo
(74) *Attorney, Agent, or Firm* — Christopher & Weisberg, P.A.

(57) ABSTRACT

The present disclosure relates to an inspection assembly (10) for inspecting the interior of a pipe (12). The inspection assembly (10) comprises a sensor assembly (20) adapted to receive a sensor signal and a housing (22) within which the sensor assembly (20) is at least partially arranged. The inspection assembly (10) comprises a seal (24) at a first housing end (31). Moreover, the inspection assembly (10) is adapted to assume a transport condition in which the sensor assembly (20) is positioned in a first position in the housing (22) and in which the seal (24) is closed. The inspection assembly is further adapted to assume an inspection condition in which the inspection assembly (20) is positioned in a second position, closer to the first housing end (31) as compared to the first position, and in which the seal (24) is open.

23 Claims, 8 Drawing Sheets

(51) Int. Cl.
*G03B 37/00* (2006.01)
*E21B 47/01* (2012.01)

(56) References Cited

U.S. PATENT DOCUMENTS

| | | | | |
|---|---|---|---|---|
| 5,191,932 | A | * | 3/1993 | Seefried .................. E21B 33/16 166/155 |
| 6,041,860 | A | * | 3/2000 | Nazzal .................. E21B 23/002 166/250.01 |
| 2002/0050361 | A1 | * | 5/2002 | Shaw .................... E21B 43/128 166/380 |
| 2007/0127780 | A1 | | 6/2007 | Tawfiq et al. |
| 2008/0173481 | A1 | | 7/2008 | Menezes et al. |
| 2009/0038391 | A1 | | 2/2009 | Aivalis et al. |

OTHER PUBLICATIONS

Norwegian Search Report, dated Jun. 30, 2014, for corresponding Patent Application No. 20131619, filed Dec. 5, 2013 consisting of 2 pages.

* cited by examiner

INSPECTION ASSEMBLY

CROSS-REFERENCE TO RELATED APPLICATIONS

This application is a Submission under 35 U.S.C. § 371 for U.S. National Stage Patent Application of, and claims priority to, International Application No. PCT/EP2014/076042 entitled INSPECTION ASSEMBLY, filed Dec. 1, 2014, which is related to and claims priority from Norwegian Patent Number 20131619, filed Dec. 5, 2013, the entire contents of all of which are hereby incorporated herein by reference.

TECHNICAL FIELD

The present disclosure relates to an inspection assembly. Moreover, the present disclosure relates to a method for inspecting the interior of a pipe.

BACKGROUND

In the drilling and production of oil and gas wells, it is often desired to obtain information concerning conditions within a borehole. For example, tools and other objects may become lodged in the borehole during the drilling of a well. Such objects must be retrieved before drilling can continue.

In the operation and/or periodic maintenance of exploration, production or injection wells, it is frequently desired to obtain information about the construction and/or operating conditions of equipment located downhole. For example, detection of the onset of corrosion damage to well tubing or casing within a borehole enables the application of anti-corrosive treatments to the well. Early treatment of corrosive well conditions prevents the highly expensive and dangerous replacement of corrosion damaged well production components.

Other maintenance operations in a production well environment, such as replacement of various flow control valves or the inspection of the location and condition of casing perforations, make it highly desirable for an operator located at the surface to obtain accurate, real-time information about downhole conditions.

In fact, new regulations require operators of oilfields to perform a visual inspection of their safety/barrier valves after certain operations to verify cleanness to secure a further safe operation. This refers especially to BlowOut Preventers (BOP) which are large, specialized valves or similar mechanical devices, usually installed redundantly in stacks, used to seal, control and monitor oil and gas wells, and intended to prevent tubing (e.g. drill pipe and well casing), tools and drilling fluid from being blown out of the wellbore—or bore hole—, when a blowout threatens.

Various techniques have been proposed for obtaining information about the conditions within a borehole, well, pipe or other tubular constructions filled with contaminated fluid with an image sensor/camera. One example is disclosed in U.S. Pat. No. 4,938,060, to Halliburton (ex-OTIS), inv Sizer et al. It includes a method of bringing coiled tubing having an inspection sensor down into a wellbore to a selected location, injecting an optically transparent or acoustically homogenous fluid into the wellbore through the coiled tubing to form a slug of such fluid around the sensor, and transmitting signals from the sensor representative of well conditions to the surface. The method may be practiced to inspect only the region around the sensor at a selected depth in the well, or it may be continuously practiced to examine the length of the wellbore by producing the well and retrieving the coiled tubing and sensor at a controlled rate synchronized with the rate of well production.

One problem with U.S. Pat. No. 4,938,060 is that it is a slow and expensive solution, requiring the use of coiled tubing and the circulation and consumption of a large amount of transparent liquid. For instance, the coiled tubing may get stuck in e.g.

irregularities of the wellbore. Moreover, the inspection sensor may get damaged in its way down to the selected location.

SUMMARY

One object of the disclosure is to reduce or ameliorate at least one of the disadvantages of the prior art systems and/or methods, or to provide a useful alternative.

This object is achieved by a sensor cover according to claim 1. As such, the present disclosure relates to an inspection assembly for inspecting the interior of a pipe. The inspection assembly comprises a sensor assembly adapted to receive a sensor signal and a housing within which the sensor assembly is at least partially arranged. The inspection assembly comprises a seal at a first housing end.

The inspection assembly is adapted to assume, i.e. be in, a transport condition in which the sensor assembly is positioned in a first position in the housing and in which the seal is closed. The inspection assembly is further adapted to assume, i.e. be in, an inspection condition in which the sensor assembly is positioned in a second position, closer to the first housing end as compared to the first position, and in which the seal is open.

As such, the inspection assembly according to the present disclosure implies that the sensor assembly is protected prior to use, e.g. during transport to an inspection site, whereas the sensor assembly may be in a position to obtain sensor information in an appropriate manner when located at a desired inspection site.

The inspection assembly may have a cylindrical shape with a circular outer cross section. The circular outer cross section may be selected so as to be able to be transported in the pipe or pipe assembly that is to be inspected.

Optionally, the inspection assembly comprises a sensor transmission fluid transparent to the sensor signal. The sensor transmission fluid is prevented from leaving the housing when the seal is closed. At least a portion of the sensor transmission fluid is allowed to exit the housing when the seal is open.

The inspection assembly as presented hereinabove implies that the sensor transmission fluid may enter a portion of the pipe to be inspected and thus provide transparency for the sensor assembly.

Optionally, at least a portion of the sensor transmission fluid is accommodated within the housing.

By virtue of the fact that the sensor transmission fluid is accommodated within the housing may have the advantage that the transmission fluid may protect the sensor assembly, from e.g. shocks etcetera, as the inspection assembly is moved towards an inspection site inside a pipe.

Optionally, the seal is adapted to assume the open condition when a pressure difference between the pressure of the sensor transmission fluid and the pressure of a fluid that is ambient of the inspection assembly in use exceeds a predetermined pressure difference threshold value. The above feature implies that the inspection assembly does not necessarily have to be equipped with means connected to the seal, such as an actuator or the like, for actively open the seal.

Optionally, the seal comprises a membrane that is adapted to break when the pressure difference exceeds the predetermined pressure difference threshold value.

Optionally, the membrane is an elastomeric membrane, such as a rubber membrane. The membrane preferably comprises notches and/or perforations.

Optionally, the seal comprises a valve.

Optionally, the valve is adapted to open when the pressure difference exceeds the predetermined pressure difference threshold value.

Optionally, the sensor assembly is slidably arranged within the housing. By virtue of the fact that the sensor assembly is slidably arranged within the housing, the sensor assembly as such may be moved towards the seal and may thus be used for increasing the inner pressure applied to the seal. Moreover, a slidably arranged sensor assembly implies that the sensor assembly may be moved from a protected transport position to an inspection position in a straightforward manner.

Optionally, the sensor assembly comprises a sensor assembly abutment surface and the housing comprises a housing abutment surface, the sensor assembly abutment surface being adapted to abut the housing abutment surface in said inspection condition.

The above two abutment surfaces may prevent the sensor assembly from falling out of the housing, even when the seal is in an open condition.

Optionally, the inspection assembly comprises a pressurizer adapted to increase the pressure of the sensor transmission fluid.

Optionally, at least a first portion of the sensor transmission fluid is accommodated within the housing between the seal and the sensor assembly. Such a first portion may protect the sensor assembly and/or the seal, since the risk of obtaining a contact between the sensor assembly and the seal is reduced, as the inspection assembly is transported in a pipe.

Optionally, a second portion of the sensor transmission fluid is accommodated within the housing between the pressurizer and the sensor assembly.

Optionally, the inspection assembly comprises a bypass arrangement allowing the second portion of the sensor transmission fluid to pass the sensor assembly when the sensor assembly is located adjacent to the seal. The bypass arrangement implies that the second portion of the sensor transmission fluid may be used for providing an appropriate inspection volume around the sensor assembly.

Optionally, the bypass arrangement comprises a bypass passage at least partially delimited by the housing and the inspection assembly when the inspection assembly (10) is in the inspection condition.

Optionally, the pressurizer comprises a piston accommodated within the housing such that the sensor assembly as well as the seal is located on the same side of the piston.

Optionally, the pressurizer comprises a pump, the pump being adapted to apply a pressure to the piston.

Optionally, the pump is adapted to utilize fluid that is ambient of the inspection assembly when in use for applying a pressure to the piston.

Optionally, the pump comprises a centrifugal pump and/or a progressive cavity pump.

Optionally, at least a portion of the sensor assembly is adapted to extend out of the housing when the inspection assembly assumes the inspection condition. The possibility to extend out of the housing implies an increased possibility to obtain detailed sensor information from the sensor assembly. In an example where the sensor assembly is a camera, the camera may have an increased possibility to e.g. record 360° images around the interior of the pipe if a portion of the camera is adapted to extend out of the housing.

Optionally, the inspection assembly comprises a sealing arrangement adapted to seal the space between an inner wall of the pipe and an outer wall of the housing.

Optionally, the sensor transmission fluid is optically and/or acoustically transparent.

Optionally, the sensor transmission fluid has a density that is within the range of 1.0 to 1.30 times, preferably 1.05 to 1.15 times, the density of the fluid that is ambient of the inspection assembly when in use.

Optionally, the sensor transmission fluid has a viscosity that is within the range of 1.0 to 1.30 times, preferably 1.05 to 1.15 times, the viscosity of the fluid that is ambient of the inspection assembly when in use.

Optionally, the sensor assembly comprises a camera.

A second aspect of the present disclosure relates to a method for inspecting the interior of a pipe using an inspection assembly. The inspection assembly comprises a sensor assembly adapted to receive a sensor signal and a housing within which the sensor assembly is at least partially arranged. The inspection assembly comprises a seal that is attached to the housing at a first housing end. The inspection assembly is adapted to assume a transport condition in which the sensor assembly is positioned in a first position in the housing and in which the seal is closed. The method comprises:

positioning the inspection assembly in the pipe;
allowing the seal to open;
positioning the inspection assembly in a second position, closer to the first housing end as compared to the first position, and
inspecting the pipe using the sensor assembly.

Optionally, the inspection assembly comprises a sensor transmission fluid transparent to the sensor signal. The sensor transmission fluid is accommodated within the housing. The method further comprises ensuring that at least a portion of the sensor transmission fluid exits the housing and enters the environment ambient of the sensor assembly.

Optionally, the method comprises forcing at least a portion of the sensor transmission fluid out of the housing by conducting the sensor assembly towards the first housing end.

Optionally, the inspection assembly comprises a pressurizer and the method comprises activating the pressurizer in order to increase the pressure of the sensor transmission fluid.

The embodiments herein are not limited to the features and advantages mentioned above. A person skilled in the art will recognize additional features and advantages upon reading the following detailed description.

FIGURES

DETAILED DESCRIPTION

In the following, the embodiments herein will be discussed and example embodiments described by referring to the accompanying drawings.

The invention relates to an inspection assembly for inspection of all kinds of fluid-filled tubulars such as pipes, oil—and gas wells, production—and workover risers, BOPS etc., where visual camera or other optical or acoustic inspection methods are being performed with enhanced image quality, more particularly, to a device for enabling an unobstructed optical or acoustic inspection of physical conditions within a borehole. The invention may be practiced e.g. during maintenance and servicing of oil, gas, geothermal, and injection wells.

Several inspection arrangements for tubular devices like pipes, oil- and gas wells and production- and workover risers, BOPS etc. which include cameras or other forms of image sensors are known. In a typical arrangement, a probe connected to a wire is lowered into the pipe to be inspected by means of a motorized winch. For visual inspection, the probe could be a shielded camera transmitting captured images through a cable which could run through, be a part, of or constitute the wire.

The movements of the probe and the camera itself, is controlled by an operator onshore or at a rig through a user interface which also displays the images captured by the camera. Such an arrangement allows for inspection of the inner surface of the pipes and wells, as well as risers, valves and BOPS. For the purpose of simplicity, all kinds of tubular devices and arrangements like pipes, oil—and gas wells and production—and workover risers, BOPS etc are referred to as pipes in the following description.

Figure 1A:
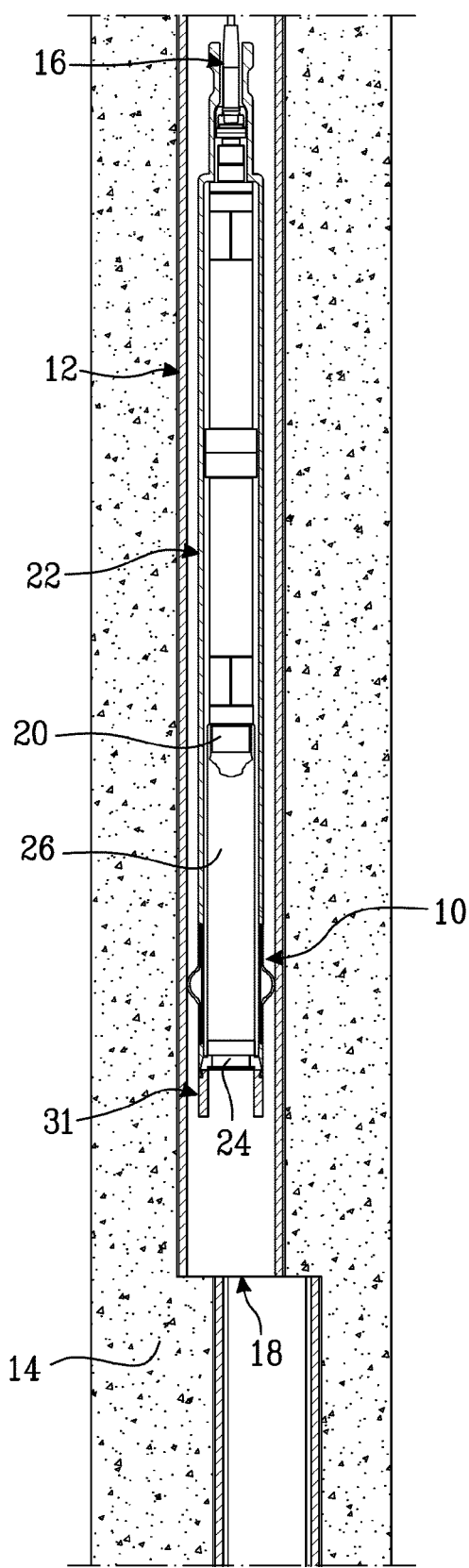
FIGS. 1a to 1c illustrate a pipe with an inspection assembly.

FIG. 1 illustrates an example of an inspection assembly 10 for inspecting the interior of a pipe 12. In FIG. 1a, the pipe 12 is located in the seabed 14. However, it is envisaged that the inspection assembly 10 may be used for other types of pipes as well, e.g. pipes that are located in the water (not shown) or even on land.

The inspection assembly 10 may be moved in relation to the pipe 12 by means of a cable assembly 16. The cable assembly 16 may comprise at least a weight supporting cable portion (not shown) adapted to support the weight of the inspection assembly 10. Moreover, the inspection assembly 10 may comprise a signal transmitting cable portion (not shown) adapted to transmit signals from the inspection assembly 10.

FIG. 1a further illustrates that the pipe 12 comprises an inspection area 18, viz an area of the pipe 12 for which inspection is desired. In the FIG. 1a example, the inspection area 18 is exemplified as a rupture, of fracture, in the pipe 12.

Moreover, FIG. 1a illustrates that the inspection assembly 10 comprises a sensor assembly 20 adapted to receive a sensor signal and a housing 22 within which the sensor assembly 20 is at least partially arranged. The sensor assembly 20 may for instance comprise a camera.

The inspection assembly comprises a seal 24 that is attached to the housing at a first housing end 31. Moreover, the inspection assembly 10 illustrated in FIG. 1a comprises a sensor transmission fluid 26 transparent to the sensor signal. In the embodiment illustrated in FIG. 1a to FIG. 1c, the sensor transmission fluid is accommodated within the housing 22.

Moreover, in FIG. 1a, the inspection assembly 10 assumes a transport condition in which the sensor assembly 20 is positioned in a first position in the housing and in which the seal is closed. As such, in the transport condition illustrated in FIG. 1a, the sensor assembly 20 is prevented from direct contact with the pipe 12 or objects (not shown) located within the pipe.

Purely by way of example, and depending on the type of the sensor assembly, the sensor transmission fluid 26 may be optically and/or acoustically transparent.

As a non-limiting example, the sensor transmission fluid 26 may have a density that is within the range of 1.0 to 1.30 times, preferably 1.05 to 1.15 times, the density of the fluid that is ambient of the inspection assembly 10 when in use.

Moreover, and again as a non-limiting example, the sensor transmission fluid 26 has a viscosity that is within the range of 1.0 to 1.30 times, preferably 1.05 to 1.15 times, the viscosity of the fluid that is ambient of the inspection assembly when in use.

As a non-limiting example, the sensor transmission fluid 26 may be salt water.

As can be seen if FIG. 1a for instance, the outer dimensions of the sensor assembly 20 may preferably be adjusted to the inner dimensions of the housing 22, so that the sensor assembly 20 is guided and can slide through at least a portion of the housing 22.

Figure 1B:
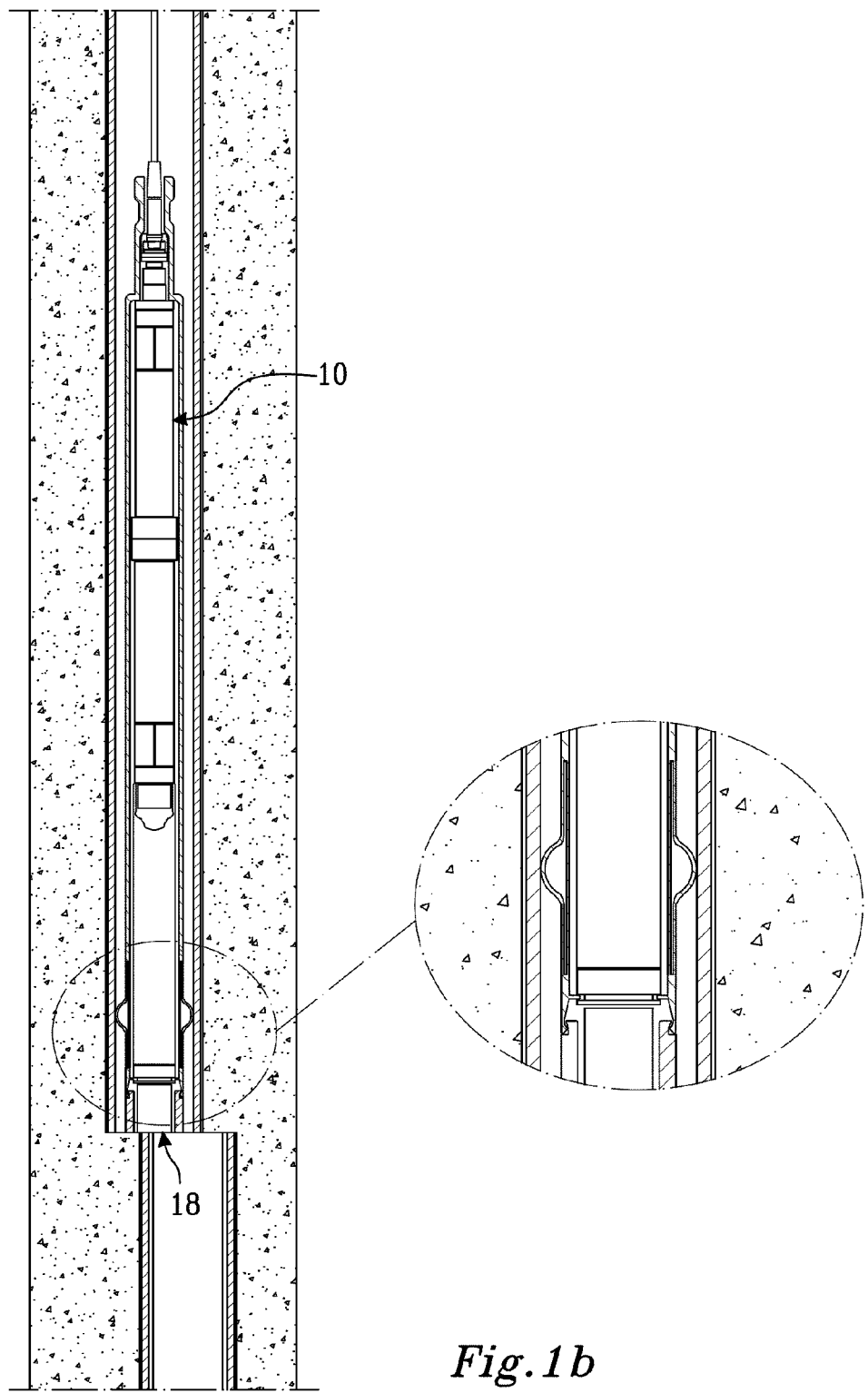

FIG. 1b illustrates that the inspection assembly 10 is moved towards the inspection area 18. Moreover, FIG. 1c illustrates that the inspection assembly 10 has reached a desired position in relation to the inspection area 18 and that the seal 24 has assumed an open condition in which the transmission fluid 26 can exit the housing 22 and instead take the place of a portion of the pipe fluid 28 to thereby enable the sensor signal to be transmitted from the a portion of the pipe 12, such as the pipe wall 30, to the sensor 20.

Figure 1C:
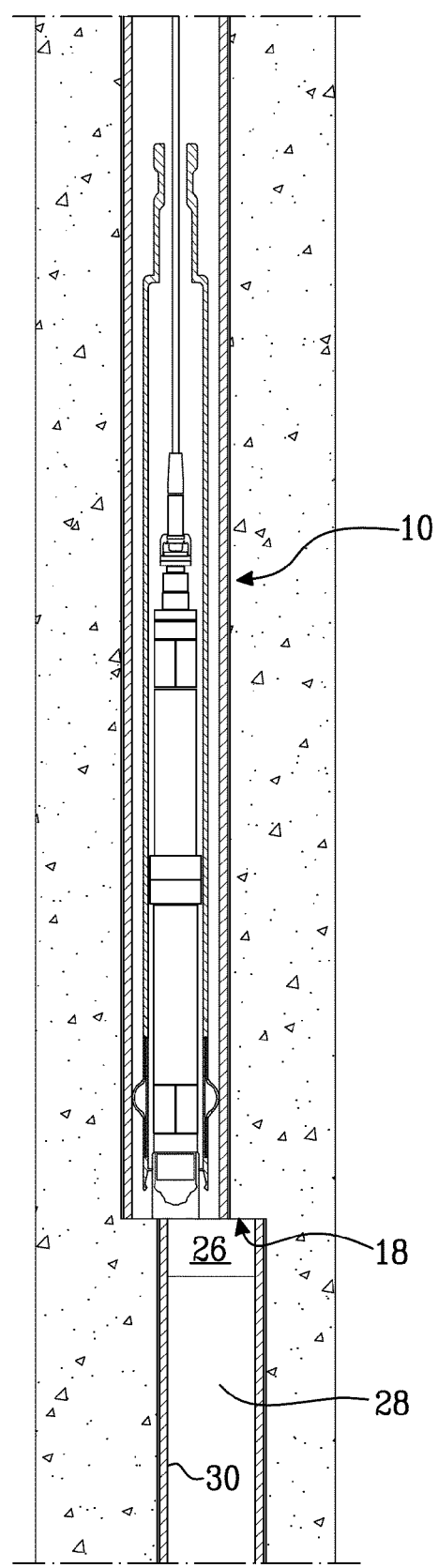

As such, in FIG. 1c, the inspection assembly 10 has assumed an inspection condition in which the inspection assembly is positioned in a second position, closer to the seal 24 as compared to the first position, and in which the seal 24 is open.

Depending on the embodiment of the inspection assembly 10, the seal 24 may assume an open condition in a plurality of ways. For instance, the seal 24 may comprise a valve (not shown) and/or a hatch (not shown). As another example, the seal 24 may comprise a membrane of a relatively brittle material and/or a membrane that comprises notches and/or perforations.

In the example illustrated in FIG. 1a to FIG. 1c, the seal 24 may assume an open condition due to the fact that when the inspection assembly is lowered to the inspection area 18 the housing 22 may stop its downward motion when it abuts the rupture of the inspection area 18. At the same time, the sensor assembly 20 may continue its downward motion, due to gravity, resulting in an increase of the pressure of the transmission fluid 26 which is located between the sensor assembly 20 and the seal 24.

When the pressure of the transmission fluid 26 has reached a predetermined threshold value, the seal 24 assumes its open condition, e.g. by opening the valve or hatch or by virtue of the fact that the seal brakes, and the transmission fluid 26 may exit the housing 22. As such, and as is illustrated in FIG. 1c, the sensor assembly 20 then has a clear view to the inspection area 18 allowing it to capture information to be transmitted through e.g. the wire line, for inspection.

Figures 2A, 2B:
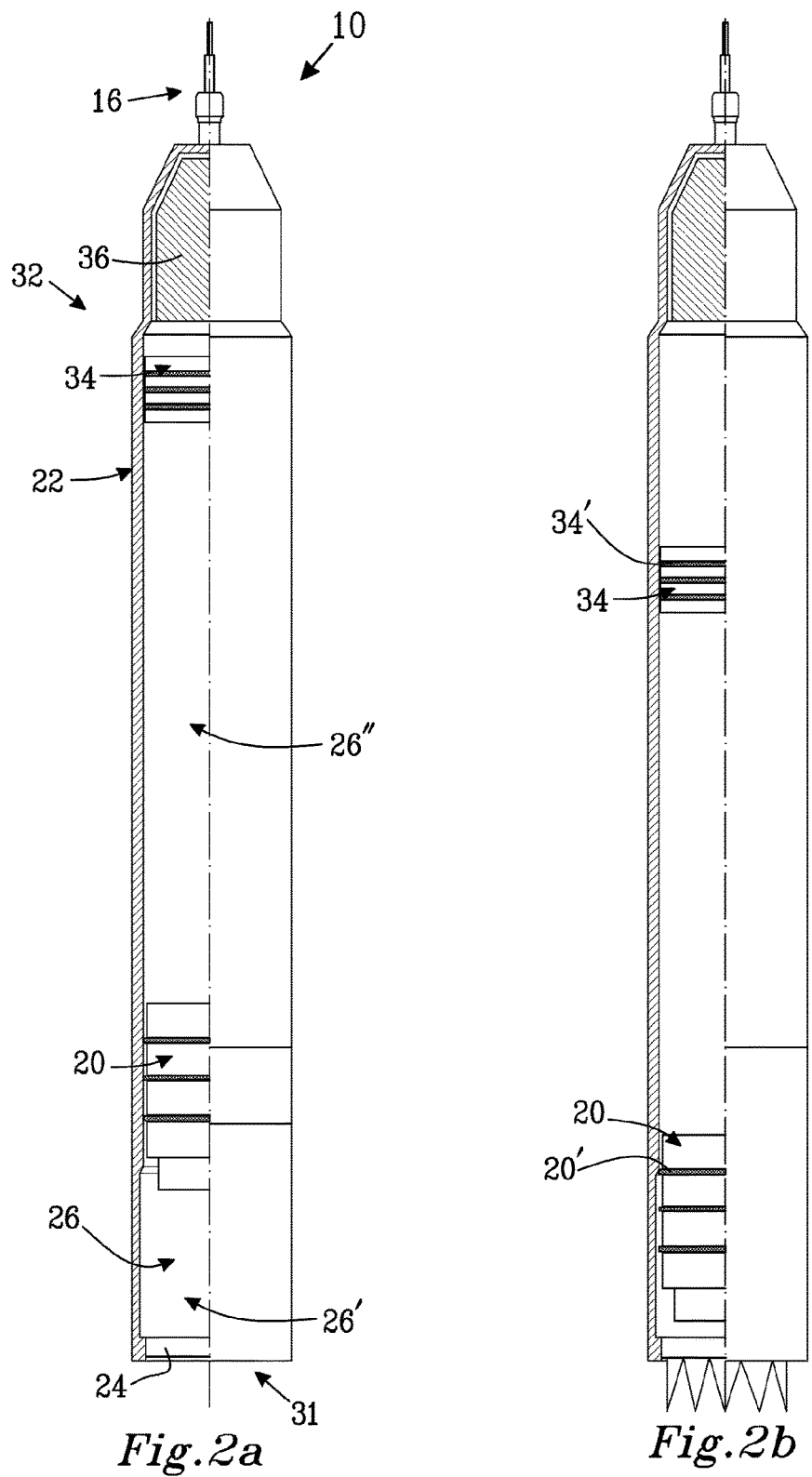
FIGS. 2a to 2c illustrate an embodiment of an inspection assembly.
Figure 2C:
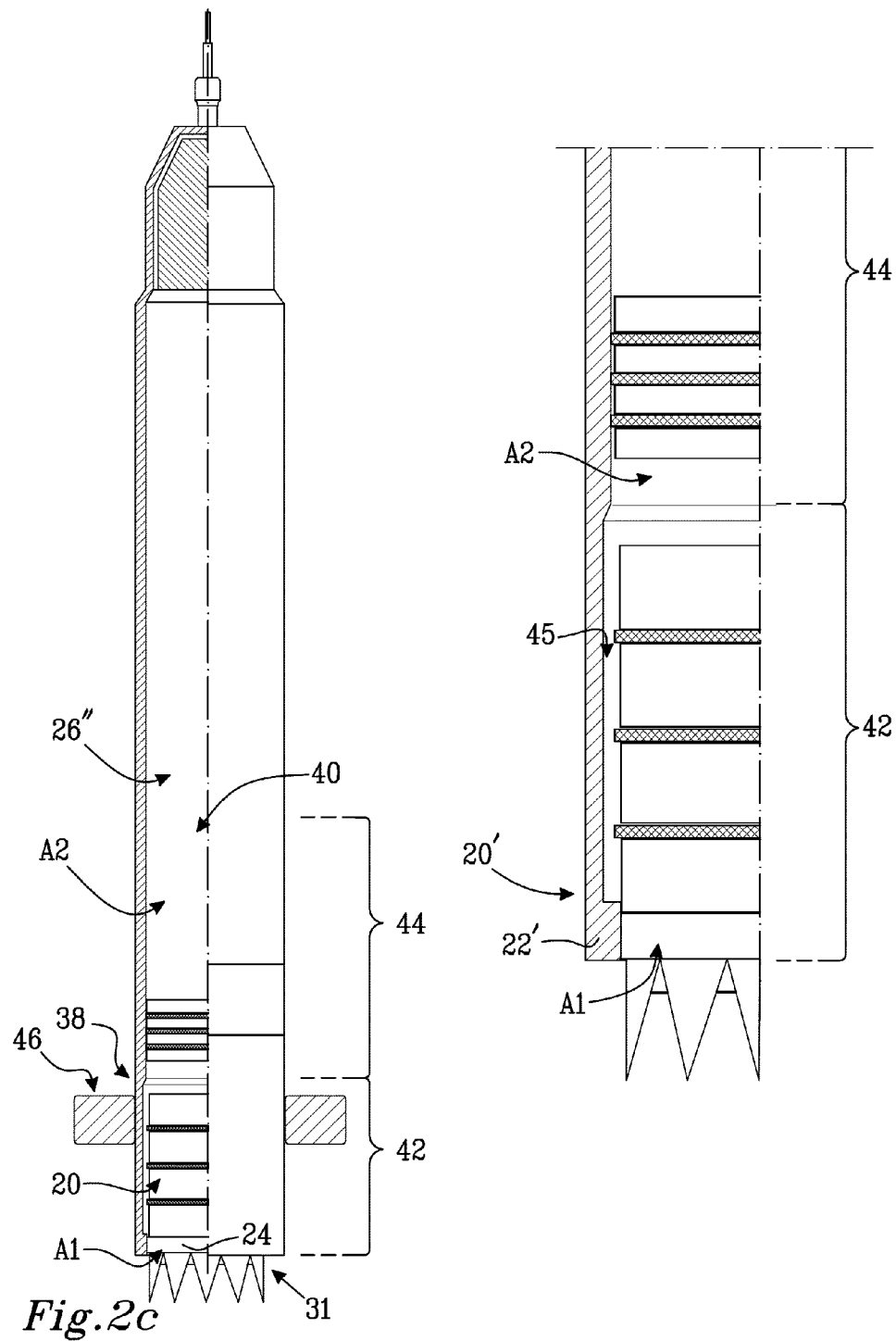

FIGS. 2a to 2c illustrate an embodiment of an inspection assembly 10. The illustrated embodiment of the inspection assembly 10 comprises a sensor assembly 20 adapted to receive a sensor signal and a housing 22 within which the sensor assembly 20 is at least partially arranged. In FIGS. 2a to 2c, the sensor assembly is slidably arranged within the housing.

Moreover, the inspection assembly 10 comprises a seal 24 that is attached to the housing 22 at a first housing end 31. Moreover, the inspection assembly 10 comprises a sensor transmission fluid 26 transparent to the sensor signal.

The sensor transmission fluid is accommodated within the housing 22. Moreover, the seal 24 is adapted to assume an open condition in which the transmission fluid 26 can exit the housing 22.

The seal 24 may be adapted to assume the open condition when a pressure difference between the pressure of the sensor transmission fluid 26 and the pressure of a fluid that is ambient of the inspection assembly in use exceeds a predetermined pressure difference threshold value.

As has been intimated hereinabove, the seal 24 may comprise a valve (not shown) and/or a hatch (not shown). However, FIG. 2a illustrates another embodiment of the inspection assembly 10 wherein the seal 24 comprises a membrane that is adapted to break when the pressure difference exceeds the predetermined pressure difference threshold value. An implementation of such a membrane is discussed hereinbelow with reference to FIG. 4.

As has been discussed hereinabove, the seal 24 may be adapted to assume the open condition when a pressure difference between the pressure of the sensor transmission fluid 26 and the ambient fluid exceeds a predetermined threshold value.

To this end, it may be advantageous if the sensor transmission fluid 26 could be pressurized in order to obtain the above discussed pressure difference.

One example that has been discussed hereinabove with reference to FIGS. 1a to 1c, the sensor transmission fluid could be pressurized by the motion of the sensor assembly 20 relative to the housing 22. To this end, the outer cross-section of the sensor assembly 20 may preferably correspond to the inner cross-section of the housing 22.

In the example illustrated in FIGS. 1a to 1c, the relative motion between the sensor assembly 20 and the housing 22 is obtained by virtue of the fact that the housing 22 is prevented from a downward motion due to the presence of a rupture or other irregularity in the pipe (not shown in FIGS. 2a to 2c) whereas the sensor assembly 20 continues to move downwards, due to gravity.

Instead of, or in addition to, the embodiment that has been discussed in relation to FIGS. 1a to 1c, the inspection assembly 10 may comprise a pressurizer 32 adapted to increase the pressure of the sensor transmission fluid 26.

In the embodiment illustrated in FIG. 2a, the pressurizer comprises 32 a piston 34 accommodated within the housing 22 such that the sensor assembly 20 as well as the seal 24 is located on the same side of the piston 34.

The piston 34 may be adapted to be forced in a direction towards the seal 24 when it is desired to allow sensor transmission fluid 26 to exit the housing.

To this end, the outer cross-section of the piston 34 may preferably correspond to the inner cross-section of the housing 22. As a non-limiting example, the piston 34 may comprise one or more seals 34', such as piston rings, see FIG. 2b.

In a similar vein, the sensor assembly 20 may comprise one or more seals 20', see FIG. 2b.

Purely by way of example the piston 34 may be connected to an actuator (not shown), such as a linear actuator (not shown) or a hydraulic actuator (not shown).

As another option, the pressurizer 32 may comprise a pump 36. The pump 36 may be adapted to apply a pressure to the piston 34, i.e. on the side of the piston 34 that faces away from the sensor assembly 20. As a non-limiting example, the pump 36 may comprise a centrifugal pump (not shown) and/or a progressive cavity pump (not shown). Irrespective of which type of pump being used, the pump may preferably be adapted to utilize fluid that is ambient of the inspection assembly 10 when in use for applying a pressure to the piston 34.

In the embodiment illustrated in FIG. 2a, at least a first portion 26' of the sensor transmission fluid 26 is accommodated within the housing 22 between the seal 24 and the sensor assembly 20.

Moreover, in the embodiment illustrated in FIG. 2a, a second portion 26" of the sensor transmission fluid 26 is accommodated within the housing 22 between the pressurizer 32 and the sensor assembly 20.

FIG. 2c further illustrates that the inspection assembly 10 may comprise a bypass arrangement 38 allowing the second portion 26" of the sensor transmission fluid 26 to pass the sensor assembly 20 when the sensor assembly 20 is located adjacent to the seal 24.

In the embodiment illustrated in FIGS. 2a to 2c, the bypass arrangement 38 comprises a housing cavity 40 in which the sensor assembly 20 is moveable. The housing cavity 40 comprises a first housing cavity portion 42, proximal to the seal 24, with a first cross-sectional area $A_1$ and a second housing cavity portion 44, distal to the seal 24, with a second, preferably substantially constant, cross-sectional area $A_2$. The first cross-sectional area $A_1$ is greater than the second cross-sectional area $A_2$. Moreover, first cross-sectional area $A_1$ is greater than the cross-sectional area of the sensor assembly 20. In this way, a fluid passage is created between the sensor assembly 20 and the housing 22 in the first housing cavity portion 42.

As such, in the FIG. 2c embodiment and condition of the inspection assembly 10, when the sensor assembly 20 is located proximal to the original location to the seal 24, the second portion 26" of the sensor transmission fluid 26 is allowed to pass the sensor assembly 20 by virtue of the fact that the first cross-sectional area $A_1$ of the first housing cavity portion 42 is larger than the cross-sectional area of the sensor assembly 20. Thus, when the inspection assembly 10 is in the inspection condition, a bypass passage 45, at least partially delimited by the housing 22 and the inspection assembly 20, is formed.

In the embodiment illustrated in FIG. 2c, each one of the first housing cavity portion 42 and the sensor assembly 20 has a circular cross-section. However, it is also envisaged that at least one of the first housing cavity portion 42 and the sensor assembly 20 has a non-circular cross-section. Purely by way of example, the first housing cavity portion 42 may have an oval or rectangular shape whereas the sensor assembly 20 may have another shape such that one or more longitudinal gaps are formed therebetween.

As another example, the first housing cavity portion 42 may comprise one or more grooves (not shown) that extend towards the first housing end 31. The second portion 26" of the sensor transmission fluid 26 may be conducted in the above discussed grooves when the sensor assembly 20 is located proximal to the original location to the seal 24.

As may be gleaned from FIG. 2c, at least a portion of the sensor assembly 20 may be adapted to extend out of the housing 22 when the seal 24 assumes the open condition.

To this end, the sensor assembly 20 may comprise a sensor assembly abutment surface 20' and the housing 22 may comprise a housing abutment surface 22'. The sensor assembly abutment surface 20' may be adapted to abut the housing abutment surface 22', e.g. when the sensor assembly 20 is located proximal to the original location to the seal 24. In this way, the sensor assembly 20 is prevented from completely exiting the housing 22.

In the implementation of the sensor assembly 20 illustrated in FIG. 2c, the sensor assembly abutment surface 20' is obtained by the fact that a cross-sectional area of the lower portion of the sensor assembly 20 is smaller than the cross-sectional area of an upper lower portion and that abutment surface is formed in the transition between the upper and lower portions of the sensor assembly 20. However, it is also envisaged that the sensor assembly 20 may comprise a protrusion (not shown) extending from the main portion of the sensor assembly 20.

The embodiment of the inspection assembly illustrated in FIG. 2c comprises a sealing arrangement 46 adapted to seal the space between an inner wall of the pipe (not shown in FIG. 2c) and an outer wall of the housing 22. The sealing arrangement 46 may have the advantage that the sensor transmission fluid 26 is maintained close to the sensor assembly 20 for an appropriate time instead of flowing upwards past the sensor assembly 20.

Figure 3A:
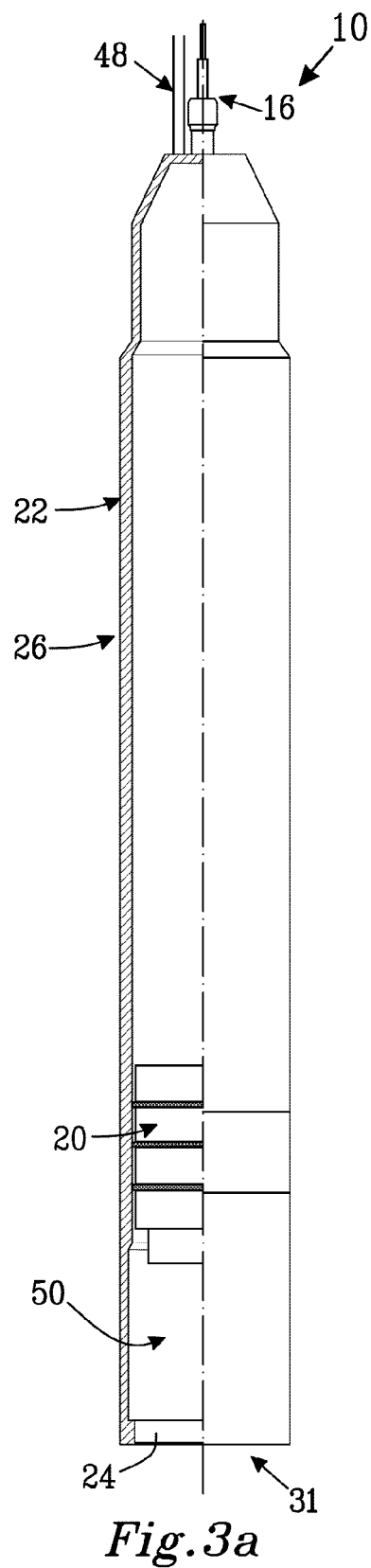
FIGS. 3a to 3c illustrate an embodiment of an inspection assembly.
Figure 3B:
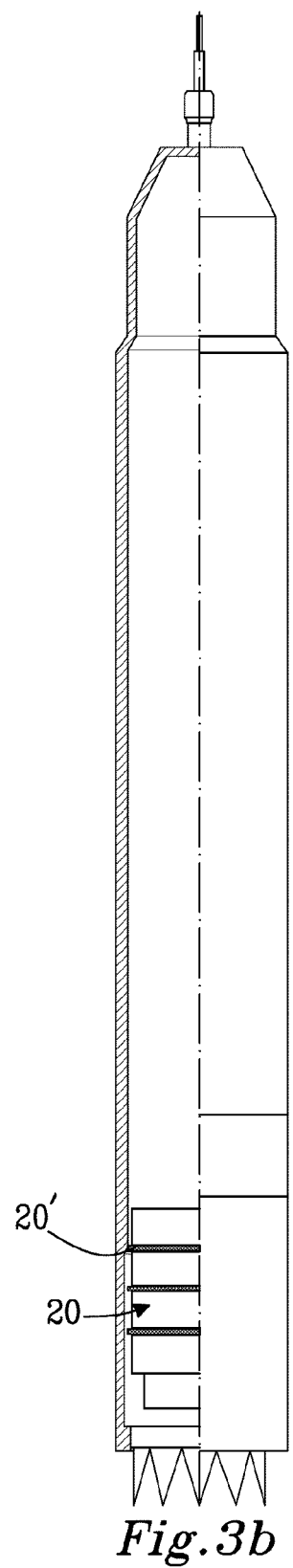
Figure 3C:
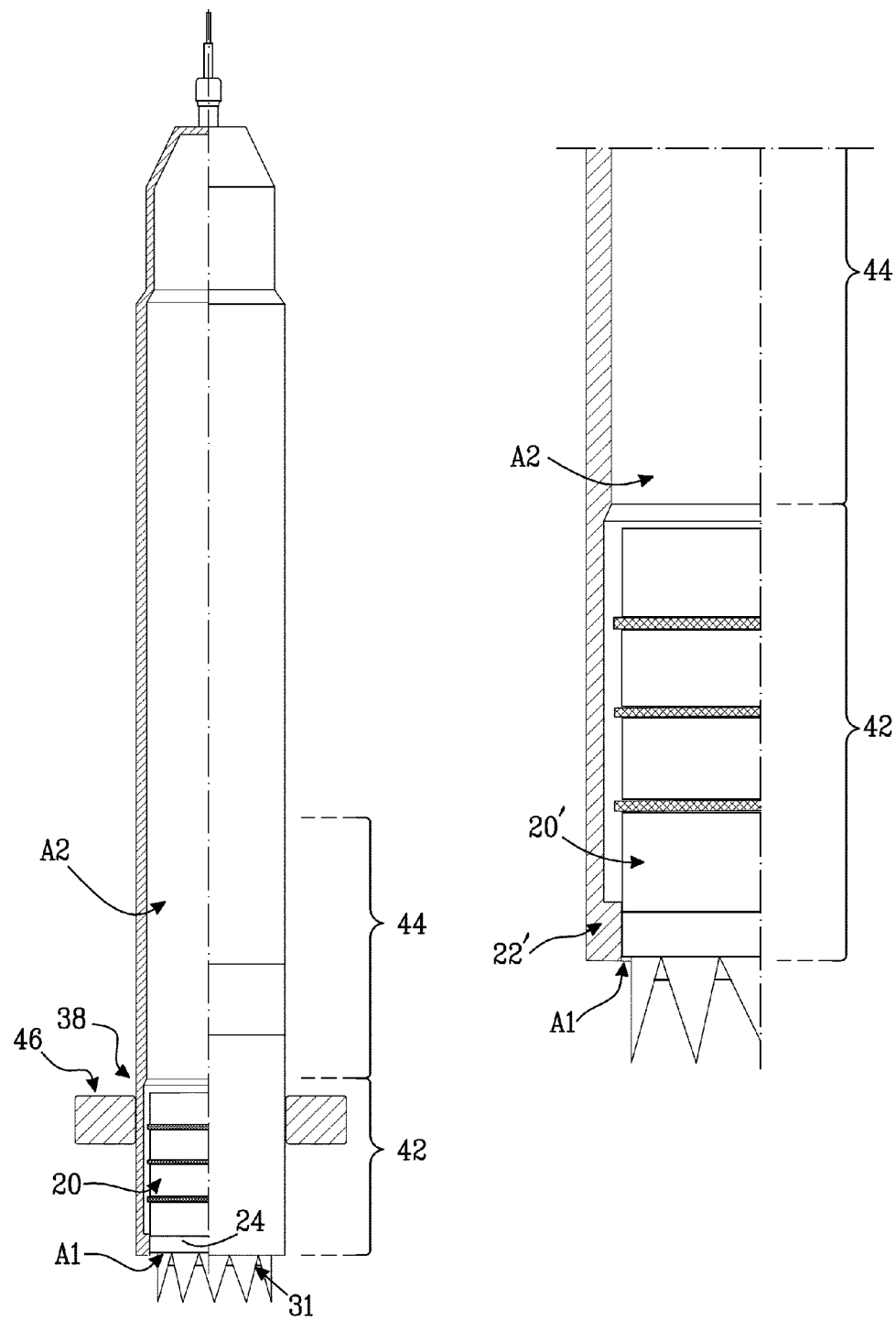

FIGS. 3a to 3c illustrate another embodiment of an inspection assembly 10. As compared to the embodiment illustrated in FIGS. 2a to 2c, the FIG. 3 embodiment does not comprise a piston 34 or a pressurizer 32 within the housing 22. Instead, the FIG. 3 inspection assembly comprises a conduit 48 for sensor transmission fluid supply to the housing 22. Purely by way of example, the conduit 48 may comprise a pipe assembly (not shown) and/or a hose (not shown). The conduit may be in fluid communication with a distal pressurizer (not shown) which is distal from the housing 22. As a non-limiting example, the distal pressurizer may be located above sea-level.

When the FIG. 3 inspection assembly 10 is in a position close to an inspection area (not shown in FIG. 3), the distal pressurizer may be operated so as to feed sensor transmission fluid 26 to the housing 22. The sensor transmission fluid thus fed will force the inspection assembly 20 towards the seal 24 is a similar manner as has been discussed hereinabove with reference to FIGS. 2a to 2c.

Moreover, in the embodiment illustrated in FIGS. 3a to 3c, the inspection assembly 10 may comprise an initial sensor transmission fluid portion 50 that is located between the inspection assembly 20 and the seal 24. As a non-limiting example, the initial sensor transmission fluid portion 50 may be the same or similar fluid type as the sensor transmission fluid 26 that is fed via the conduit 48. However, other embodiments of the inspection assembly 10 which does not include a fluid between the inspection assembly 20 and the seal 24 are also envisaged. Such an embodiment of an inspection assembly 20 may be free from any sensor transmission fluid until such fluid is fed from the conduit 48 when the inspection assembly 10 is close to an inspection site.

In a similar manner as for the FIGS. 2a to 2c embodiment, the embodiment presented hereinabove with reference to FIGS. 3a to 3c may also comprise a bypass arrangement that allows sensor transmission fluid 26 to pass the sensor assembly 20 when the sensor assembly is proximal to the seal 24.

Figure 4:
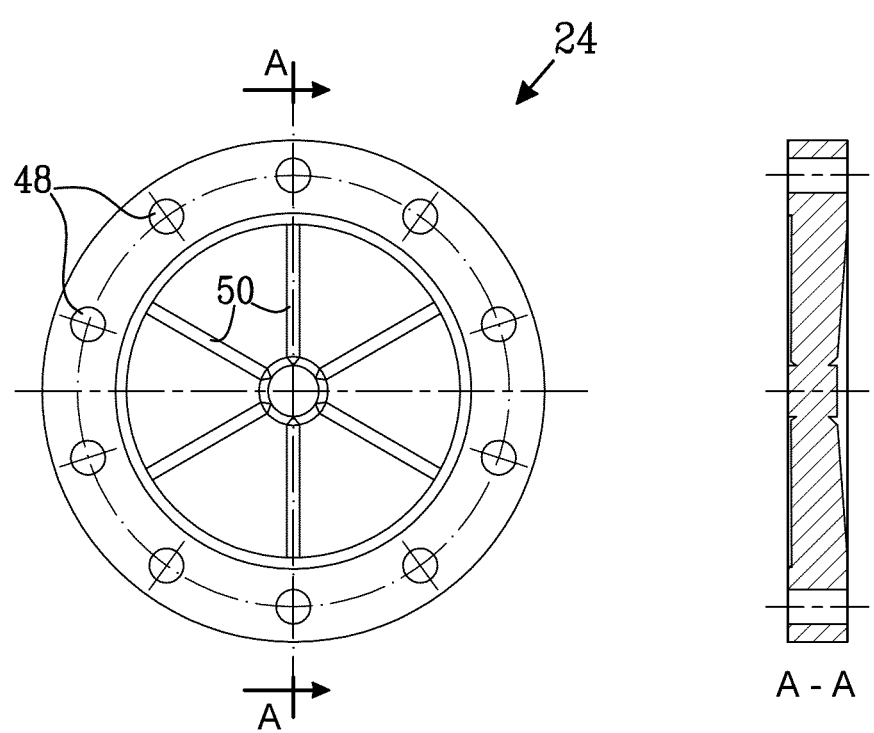
FIG. 4 illustrates an implementation of a seal.

FIG. 4 illustrates a preferred implementation of a seal 24. The FIG. 4 seal 24 is a membrane, preferably a rubber membrane, which comprises notches and/or perforations. Purely by way of example, the membrane may have a thickness within the range 5 to 30 mm, preferably 8 to 15 mm.

As may be gleaned from FIG. 4, the illustrated implementation of the seal 24 comprises a plurality of openings 48 each one of which is adapted to receive an attachment member (not shown), such as a bolt, for attachment of the seal 24 to the housing (not shown in FIG. 4). Moreover, the FIG. 4 seal comprises a plurality of notches 50, or grooves. As such when a pressure is applied to the seal 24, the seal 24 may be prone to rupture at the notches 50.

In The FIG. 4 implementation, the notches 50 are arranged like the spokes of a wheel. However, other configurations of the notches are also envisaged.

In some embodiments, at the base or lower end of the inspection assembly, a "dump valve" mechanism is provided. The valve may be operated by lifting an external spring loaded sleeve to release a mechanical latch as a resulting in the weight of the inspection assembly resting on the sleeve and compressing the spring. On releasing the latch the flap valve will open allowing access to the clear fluid. The design of the lower valve may be such that limited fluid flow will occur until the sensor assembly, which is now no longer supporting the weight of the inspection assembly, is lowered into the inspection assembly and acting as a piston which displaces the clear fluid out into e.g. a well. As the sensor assembly is lowered, well fluid may freely enter the inspection assembly above the sensor assembly ensuring pressure equilibrium. Simple seal fins on the sensor assembly may be used to maintain separation between the clear and well fluids.

As the sensor assembly lens reaches the lower end of the inspection assembly clear view of the wellbore may be obtained. The sensor assembly may have a smaller diameter lower section that will pass through the valve and extend out for some 500 mm during which time clear fluid will continue to wash past the sensor assembly with the intention of enhancing e.g. the visibility and information gained.

The outer dimensions of the inspection assembly may be customized with respect to the inner dimensions of the pipe to be inspected. The above description discloses different example embodiments for illustrative purposes. A person skilled in the art would realize a variety of inspection assemblies within the scope of the appended claims.

The invention claimed is:

1. An inspection assembly for inspecting the interior of a pipe, said inspection assembly comprising:
   a sensor assembly adapted to receive a sensor signal and a housing within which said sensor assembly is at least partially arranged;
   a seal at a first housing end, said inspection assembly being adapted to assume a transport condition in which said sensor assembly is positioned in a first position in said housing and in which said seal is closed, said inspection assembly further being adapted to assume an inspection condition in which said sensor assembly is positioned in a second position, closer to said first housing end as compared to said first position, and in which said seal is open;
   a sensor transmission fluid transparent to said sensor signal, said sensor transmission fluid being prevented from leaving said housing when said seal is closed, at least a portion of said sensor transmission fluid being allowed to exit said housing when said seal is open; and
   a pressurizer adapted to increase the pressure of said sensor transmission fluid, where said pressurizer comprises a piston accommodated within said housing such that said sensor assembly as well as said seal are located on the same side of said piston, where said pressurizer comprises a pump, said pump being adapted to apply a pressure to said piston.

2. The inspection assembly according to claim 1, wherein at least a portion of said sensor transmission fluid is accommodated within said housing.

3. The inspection assembly according to claim 2, wherein said seal is adapted to open when a pressure difference between the pressure of said sensor transmission fluid and the pressure of a fluid that is ambient of said inspection assembly in use exceeds a predetermined pressure difference threshold value.

4. The inspection assembly according to claim 3, wherein said seal comprises a membrane that is adapted to break when said pressure difference exceeds said predetermined pressure difference threshold value.

5. The inspection assembly according to claim 4, wherein said membrane is an elastomeric membrane, said membrane comprises at least one of notches and perforations.

6. The inspection assembly according to claim 1, wherein said seal comprises a valve.

7. The inspection assembly according to claim 6, wherein said seal is adapted to open when a pressure difference between the pressure of said sensor transmission fluid and the pressure of a fluid that is ambient of said inspection assembly in use exceeds a predetermined pressure difference threshold value and said valve is adapted to open when said pressure difference exceeds said predetermined pressure difference threshold value.

8. The inspection assembly according to claim 1, wherein said sensor assembly is slidably arranged within said housing.

9. The inspection assembly according to claim 8, wherein at least a first portion of said sensor transmission fluid is accommodated within said housing between said seal and said sensor assembly.

10. The inspection assembly according to claim 8, wherein said sensor transmission fluid is at least one of optically transparent and acoustically transparent.

11. The inspection assembly according to claim 8, wherein said sensor transmission fluid has a density that is within the range of 1.0 to 1.30 times the density of the fluid that is ambient of said inspection assembly when in use.

12. The inspection assembly according to claim 8, wherein said sensor transmission fluid has a viscosity that is within the range of 1.0 to 1.30 times the viscosity of the fluid that is ambient of said inspection assembly when in use.

13. The inspection assembly according to claim 1, wherein said sensor assembly comprises a sensor assembly abutment surface and said housing comprises a housing abutment surface, said sensor assembly abutment surface being adapted to abut said housing abutment surface in said inspection condition.

14. The inspection assembly according to claim 1, wherein a second portion of said sensor transmission fluid is accommodated within said housing between said pressurizer and said sensor assembly.

15. The inspection assembly according to claim 14, wherein said inspection assembly comprises a bypass arrangement allowing said second portion of said sensor transmission fluid to pass said sensor assembly when said sensor assembly is located adjacent to said seal.

16. The inspection assembly according to claim 15, wherein said bypass arrangement comprises a bypass passage at least partially delimited by said housing and said inspection assembly when said inspection assembly is in said inspection condition.

17. The inspection assembly according to claim 1, wherein the said pump is adapted to utilize fluid that is ambient of said inspection assembly when in use for applying a pressure to said piston.

18. The inspection assembly according to claim 1, wherein said pump comprises at least one of a centrifugal pump and a progressive cavity pump.

19. The inspection assembly according to claim 1, wherein at least a portion of said sensor assembly is adapted to extend out of said housing when said inspection assembly assumes said inspection condition.

20. The inspection assembly according to claim 1, wherein said inspection assembly comprises a sealing arrangement adapted to seal the space between an inner wall of said pipe and an outer wall of said housing.

21. The inspection assembly according to claim 1, wherein said sensor assembly comprises a camera.

22. A method for inspecting the interior of a pipe using an inspection assembly, said inspection assembly comprising:
a sensor assembly adapted to receive a sensor signal and a housing within which said sensor assembly is at least partially arranged;
a seal that is attached to said housing at a first housing end, said inspection assembly being adapted to assume a transport condition in which said sensor assembly is positioned in a first position in said housing and in which said seal is closed, said method comprising:
positioning said inspection assembly in the pipe;
allowing said seal to open;
positioning said sensor assembly in a second position, closer to said first housing end as compared to said first position;
inspecting said pipe using said sensor assembly where said inspection assembly comprises a sensor transmission fluid transparent to said sensor signal, said sensor transmission fluid being accommodated within said housing;
ensuring that at least a portion of said sensor transmission fluid exits said housing and enters the environment ambient of said sensor assembly; and
forcing at least a portion of said sensor transmission fluid out of said housing by conducting said sensor assembly towards said first housing end.

23. The method according to claim 22, wherein said inspection assembly comprises a pressurizer and said method comprises activating said pressurizer in order to increase the pressure of said sensor transmission fluid.

* * * * *